(12) United States Patent
Cheng et al.

(10) Patent No.: US 7,212,708 B2
(45) Date of Patent: May 1, 2007

(54) OPTICAL GRATING BASED MULTIPLEXER DEVICE WITH POWER TAP CAPABILITY

(75) Inventors: Hsing Cheng, San Jose, CA (US); Hamid R. Khazaei, Westford, MA (US); Harmeet Singh, Acton, MA (US); Emily M. Squires, Littleton, MA (US)

(73) Assignee: JDS Uniphase Corporation, Milpitas, CA (US)

( * ) Notice: Subject to any disclaimer, the term of this patent is extended or adjusted under 35 U.S.C. 154(b) by 763 days.

(21) Appl. No.: 10/690,858

(22) Filed: Oct. 22, 2003

(65) Prior Publication Data

US 2005/0089269 A1   Apr. 28, 2005

(51) Int. Cl.
  G02B 6/34    (2006.01)
  H04J 14/02   (2006.01)
(52) U.S. Cl. .............................. 385/37; 385/27; 385/48; 385/14; 385/129; 385/130; 398/79; 398/82; 398/87; 398/83; 398/91; 398/89; 398/94
(58) Field of Classification Search .................. 385/37, 385/24, 31, 14, 48, 129, 130, 131, 88, 92, 385/27; 398/79, 82, 87, 83, 91, 89, 94
See application file for complete search history.

(56) References Cited

U.S. PATENT DOCUMENTS

| 5,748,815 | A | * | 5/1998 | Hamel et al. ................. 385/37 |
| 6,052,394 | A | | 4/2000 | Lee et al. ....................... 372/6 |
| 6,130,899 | A | | 10/2000 | Epworth et al. ............... 372/6 |
| 6,351,583 | B1 | | 2/2002 | Bergmann et al. ............ 385/24 |
| 6,459,829 | B1 | | 10/2002 | Yamauchi et al. ............ 385/24 |
| 6,931,034 | B2 | * | 8/2005 | Khazaei et al. ................ 372/9 |
| 6,937,795 | B2 | * | 8/2005 | Squires et al. ................ 385/37 |
| 2002/0057875 | A1 | * | 5/2002 | Kaneko ....................... 385/37 |
| 2005/0089269 | A1 | * | 4/2005 | Cheng et al. ................. 385/27 |

* cited by examiner

*Primary Examiner*—Brian M. Healy
(74) *Attorney, Agent, or Firm*—Allen, Dyer, Doppelt Milbrath & Gilchrist, P.A.

(57) ABSTRACT

In an optical grating device, a grating arrangement receives different wavelength output signals from a plurality of radiation sources at input ports thereof, and generates therefrom a multiplexed wavelength output signal at a zero diffraction order output port of the grating arrangement. Additionally, the gating arrangement generates at least one predetermined wavelength output signal at one of a group consisting of a separate predetermined location in an at least one of a symmetric non-zero diffraction order of the grating arrangement, within the grating arrangement itself, and a combination thereof. A separate power tap is coupled to detect the power of a separate one of the at least one predetermined wavelength output signal from the grating arrangement.

21 Claims, 6 Drawing Sheets

OPTICAL GRATING BASED MULTIPLEXER DEVICE WITH POWER TAP CAPABILITY

CROSS-REFERENCE TO RELATED APPLICATIONS

This application is related to U.S. Ser. No. 10/609,857, now U.S. Pat. No. 6,937,795 which is entitled COMBINATION WAVELENGTH MULTIPLEXER AND WAVELENGTH STABILIZER" (Optovia 4), has a common assignee and two common inventors with the present application and is being filed concurrently with the present application.

FIELD OF THE INVENTION

The present invention relates to devices as, for example, transmitters and wavelength multiplexers and demultiplexers that utilize gratings (such as diffraction gratings, array waveguide gratings (AWG), etc.) wherein one or more proportional taps are needed for obtaining input and/or output power.

BACKGROUND OF THE INVENTION

Many prior art devices requiring power taps utilize couplers to tap power off of the input and/or output signal power of the device. More recently, other arrangements have been devised to provide optical power taps.

U.S. Pat. No. 5,748,815 (Hamel et al.), issued on May 5, 1998, discloses an optical component adapted to monitor a multi-wavelength link for use as an add-drop multiplexer in optical networks. The optical component includes an input optical fiber for launching a multiplexed signal comprising a plurality of different wavelength signals from a zero diffraction order of a flat blazed grating towards the grating for dispersing the wavelength signals in several non-zero orders of diffraction. A first set of optical fibers is located within a first non-zero diffraction order area (e.g., the 1 order) of the grating where each optical fiber of the first set is located to receive a separate one of the dispersed and demultiplexed wavelength signals. A second set of optical fibers is located within a second higher non-zero diffraction order area (e.g., the 2 order) of the grating. Each optical fiber in this set is located to receive a separate one of the dispersed and demultiplexed wavelength signals and transmit the wavelength signal to a separate one of a plurality of photodetectors for ascertaining the average power level coming out of each of these optical fibers. The Hamel et al. optical component is directed only for receiving a multiplexed wavelength input signal and obtaining therefrom demultiplexed wavelength signals within one diffraction area of a grating while concurrently detecting the power of the received demultiplexed wavelength signals within a second diffraction area of the grating. Wavelength drift can also be determined from the demultiplexed wavelength signals. The optical component does not provide for determining overall multiplexed signal power.

U.S. Patent Application Publication No. US 2002/0057875 A1 (Kaneko), published on May 16, 2002, discloses arrangements of an arrayed waveguide grating (AWG), optical transmitter, and optical communication system including a monitoring function for a main signal. The AWG comprises an input slab waveguide, an output slab waveguide, and a channel waveguide array having waveguides of progressively increasing lengths interconnecting the input and output slab waveguides. A first plurality of input waveguides are coupled to the input slab waveguide, each waveguide being used to launch a separate wavelength signal into the input slab waveguide. In passing through the input slab waveguide, the channel waveguide array, and the output slab waveguide, the launched waveguide signals are multiplexed and recovered at a zero diffraction order output in an output optical fiber. First and second mirrors are located to intercept multiplexed waveguide signals appearing in the first diffraction order beams of the output slab waveguide. Each mirror redirects the intercepted multiplexed waveguide signals back through the output slab waveguide, the channel waveguide array, and the input slab waveguide to demultiplex the waveguide signals for a second time. In the input waveguide slab, the waveguide signals are angularly dispersed to appear at separate locations on the input side of the input slab waveguide that do not coincide with the locations of the first plurality of input waveguides. A first and a second set of a plurality of monitoring waveguides are each disposed at separate locations of the input slab waveguide so that each waveguide of the set receives a separate one of the demultiplexed wavelength signals for monitoring purposes. In a second embodiment, a feedback loop is connected to intercept the first order diffraction beams at the output slab waveguide instead of at the first and second mirrors and to feed the multiplexed signals back through the (AWG). This arrangement is somewhat inefficient because the waveguide signals propagate twice through the AWG and introduces losses to each of the wavelength signals for each pass therethrough.

It is desirable to provide a more efficient grating based wavelength multiplexer/demultiplexer that provides wavelength power taps after only one pass through a grating device, and additionally, if desired, a total power tap. Since a multiplexed signal tap by definition has more power than the individual wavelengths that form the multiplexed signal, higher grating losses are generally acceptable for tapping the total power.

SUMMARY OF THE INVENTION

The present invention relates to optical grating based devices where wavelength signals generated by at least two light sources are multiplexed for transmission as an output signal from the system along with power taps for overall signal power and/or individual output wavelength powers that are separated within a grating based device.

From a first apparatus aspect, the present invention is an optical grating device comprising a grating arrangement, and at least one power tap. The grating arrangement receives a different wavelength signal from each of a plurality of radiation sources at separate input ports thereof, and generates therefrom an output signal of multiplexed wavelengths at a zero diffraction order output port of the grating arrangement. The grating arrangement further generates at least one predetermined wavelength output signal at one of a group consisting of a separate predetermined location in an at least one of a symmetric non-zero diffraction order of the grating arrangement, within the grating arrangement itself, and a combination thereof. Each power tap is coupled to the grating arrangement to detect the power of a separate one of the at least one predetermined wavelength output signal therefrom.

From a second apparatus aspect, the present invention relates to an optical grating device comprising a grating arrangement, and a plurality of power taps. The grating arrangement receives sufficiently separated wavelength signals from a plurality of radiation sources at separate input ports thereof, and generates therefrom a multiplexed wavelength output signal at a zero diffraction order output port of the grating arrangement, and separate ones of each of the sufficiently separated different wavelength output signals from the plurality of radiation sources that are focused at separate predetermined spaced apart locations within both areas of a set of predetermined symmetric non-zero diffraction orders of the grating arrangement. Each of the plurality of power taps is coupled to detect the power of a separate one of the sufficiently separated wavelength output signals from the plurality of radiation sources that are focused at the separate predetermined spaced apart locations within both of the predetermined symmetric From a third apparatus aspect, the present invention relates to an optical grating device comprising a grating arrangement, and first and second power taps. The grating arrangement receives each of densely spaced apart wavelength output signals from a plurality of radiation sources at separate input ports thereof, and generates therefrom a multiplexed wavelength output signal at a zero diffraction order output port of the grating arrangement, and first and second multiplexed wavelength output signals of the densely spaced apart wavelength output signals that are focused at separate predetermined locations within first and second ones of a predetermined symmetric non-zero diffraction order, respectively, of the grating arrangement. The first and second power taps are coupled to detect the power of the first and second multiplexed wavelength output signals focused within the first and second ones of the predetermined symmetric non-zero diffraction order, respectively, of the grating arrangement.

From a fourth apparatus aspect, the present invention relates to an optical grating device comprising a grating arrangement, and a plurality of power taps. The grating arrangement receives a different wavelength output signal from each of a plurality of radiation sources at separate input ports thereof, and generates therefrom a first multiplexed wavelength output signal at a zero diffraction order output port of the grating arrangement. The grating arrangement comprises a feedback loop for coupling a second multiplexed wavelength output signal appearing at a non-zero diffraction order output port of the grating arrangement back into the grating arrangement adjacent the zero diffraction order output port so that each of the different wavelength output signals in the second multiplexed output signal are demultiplexed and focus to separate input ports of the grating arrangement that are not coincident with the input ports receiving the wavelength signals from the plurality of radiation sources. Each of the plurality of power taps are coupled to the grating arrangement to detect the power of a separate one of the different wavelength output signals focused at said separate input ports thereof.

From a fifth apparatus aspect, the present invention relates to an optical grating device comprising a grating arrangement, and a first power tap. The grating arrangement is an Arrayed Waveguide Grating (AWG) comprising a first Free Propagating Region (FPR), a second FPR comprising an input and an output side thereof, and a grating array, and a first power tap. The first Free Propagating Region (FPR) receives a different wavelength output signal from each of a plurality of radiation sources at separate input ports at an input side thereof. The grating array is formed from a plurality of different length optical waveguides that couple an output side of the first FPR to the input side of the second FPR. The grating array generates both a first multiplexed wavelength output signal from the different wavelength output signals received from the plurality of radiation sources at a zero diffraction order of the second FPR, and a second multiplexed wavelength output signal at a first predetermined waveguide forming the plurality of different length optical waveguides of the grating array. The first power tap is coupled to receive the multiplexed wavelength output signal from said predetermined waveguide forming the plurality of different length optical waveguides of the grating array.

From a sixth apparatus aspect, the present invention relates to a combination comprising optical grating means, main output means, and auxiliary output means. The optical grating means includes input means for receiving signal power of different optical wavelengths from each of a plurality of radiation sources and output means for providing one of a group consisting of multiplexed power and individual power of the different optical wavelengths, the output means including a zero-order diffraction area and at least one non-zero order diffraction area. The main output means is coupled to the zero-order diffraction area for abstracting said multiplexed power in an output signal of the optical grating means. The auxiliary output means is coupled to the at least one of non-zero diffraction area for abstracting power of one of the group consisting of the multiplexed power and individual powers of the different optical wavelengths.

The invention will be better understood from the following more detailed description taken with the accompanying drawings and claims.

The drawings are not necessarily to scale.

DETAILED DESCRIPTION OF THE INVENTION

Figure 1:
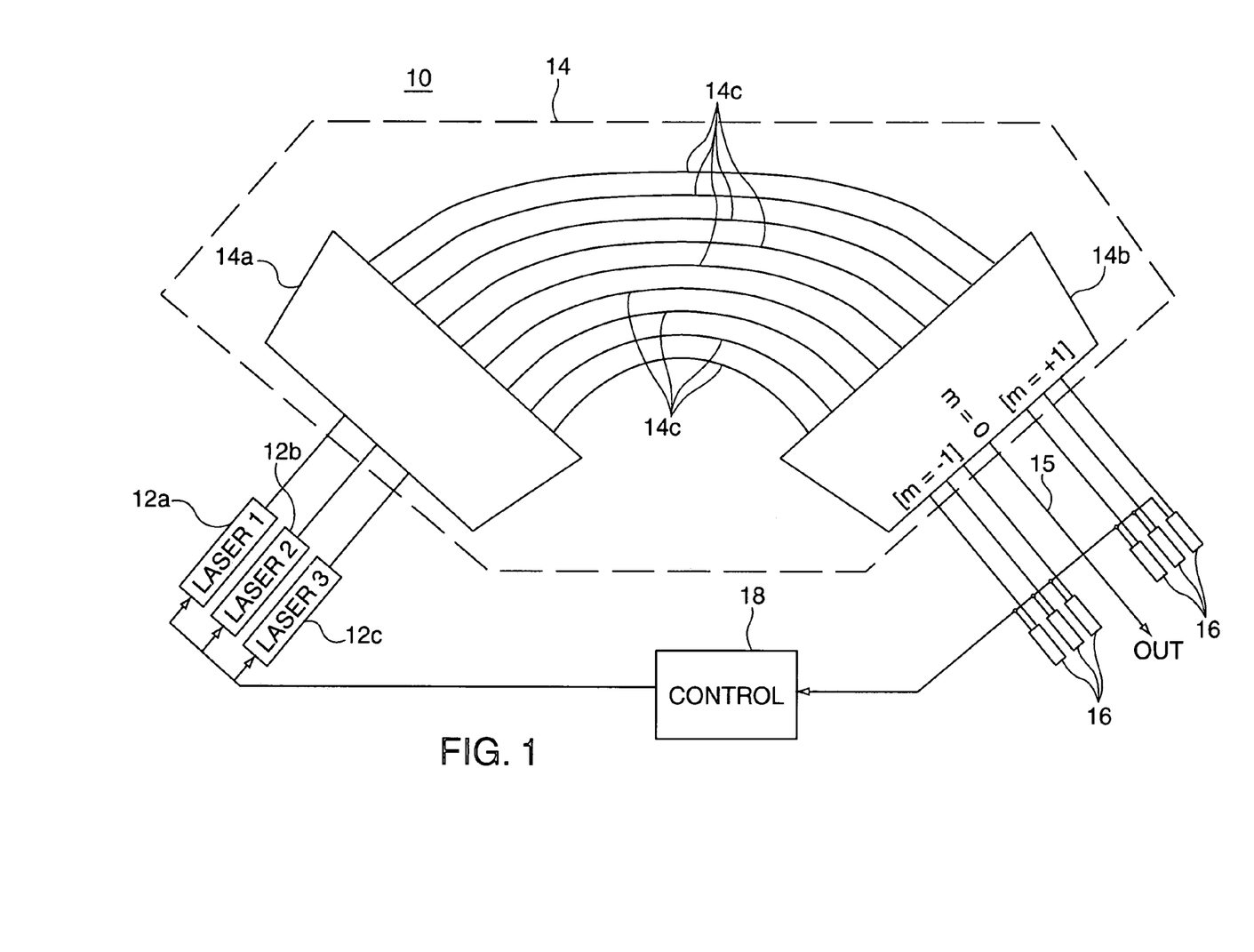
FIG. 1 is a schematic diagram of a grating based device including individual wavelength optical power taps in accordance with a first embodiment of the present invention.

Referring now to FIG. 1, there is shown a general schematic diagram of a grating based device 10 including a plurality of radiation sources (shown as, and referred to hereinafter as, lasers 12a (LASER 1), 12b (LASER 2), and 12c (LASER 3)), an Arrayed Wavelength Grating (AWG) Multiplexer (MUX 14 (shown within a dashed line area), individual wavelength optical taps 16, and an optional control device 18 in accordance with a first embodiment of the present invention. The AWG MUX 14 comprises a first Free Propagation Region (FPR) 14a, a second FPR 14b, and an optical grating section 14c formed from a plurality of predetermined different length waveguides.

Each of the plurality of lasers 12a, 12b, and 12c generates an output signal with a predetermined wavelength different from that of the other lasers. The output wavelength signals from the lasers 12a, 12b, and 12c have their wavelengths widely spaced apart (sufficiently separated) from each other, and are coupled to appropriate separate inputs of the first FPR 14a. The first and second FPRs 14a and 14b and the optical grating section 14c of the Array Waveguide Grating (AWG) 14 utilize the interference of phase shifted signals to multiplex or demultiplex optical signals as is well known in the art. In the typical case of an AWG multiplexer, multiple input signals from the lasers 12a, 12b, and 12c are individually positioned on a waveguide slab of the first FPR 14a in such a way that after propagating in turn through the waveguide slab of FPR 14a, the optical grating section 14c, and a waveguide slab of the second FPR 14b, the location of the focus point of the zeroth diffraction order (m=0) of each input wavelength signal coincides with the location chosen for the output waveguide 15. Most of the power of the input signals from the lasers 12a, 12b, and 12c is found in the zeroth diffraction order (m=0), but some power resides in non-zero diffraction orders of m=−1, m−+1, m=−2, m=+2, etc, which power decreases as the diffraction order numbers increase.

A property of an array waveguide diffraction grating (AWG) is that spacings (hereinafter designated "a") of array waveguides of the optical grating section 14c and the wavelength (hereinafter designated "w") of a channel from each of the lasers 12a, 12b, and 12c determine the location of the focal point of non-zero diffraction orders at the output of the slab of FPR 14b. This is shown in typical bulk grating equations, such as that shown in equation 1 [Eq. (1)].

$$(m)(w) = a(\sin \theta i + \sin \theta m) \quad \text{Eq. (1)}$$

where m=diffraction order, w=wavelength, a=grating spacing, $\theta i$=incident angle, and $\theta m$=diffraction angle. Additionally, each non-zero diffraction order experiences an angular dispersion. For bulk gratings, this relationship is given by equation 2 [Eq. (2)].

$$\text{Angular Dispersion} = m/a \cos \theta m = d\theta m/dw \quad \text{Eq. (2)}$$

As described by equations (1) and (2), the higher diffraction orders more efficiently separate the individual wavelengths of the lasers 12a, 12b, and 12c. However, except for blazed gratings, as the diffraction order increases, the intensity of its output signal decreases. The description hereinafter will be directed particularly to a first symmetric non-zero diffraction order (m=+1, m=−1) when referring to non-zero diffraction orders. However, the present concept extends to the higher diffraction orders as well when used in place of the first symmetric non-zero diffraction order, when wavelength channel resolution is not easily achieved within the first non-zero diffraction order area. Equations 1 and 2 can be found on pages 421 and 415, respectively, of the book entitled "Introduction To Optics" by Frank L. Pedrotti and Leno S. Pedrotti, published by Prentice Hall 1987.

For densely spaced apart wavelength channels from the lasers 12a, 12b, and 12c, the shift in focus point for individual channel wavelengths for low diffraction orders is minor (and is zero for m=0). However, for widely spaced apart (coarsely spaced, sufficiently separate) wavelength channels, the optical grating section 14c can be designed so that the non-zero diffraction orders both focus and sufficiently resolve individual wavelength channels so that the focused channel signals can be directed into separate individual output waveguides. As is shown in FIG. 1, the individual optical power taps 16 (as shown in greater detail in FIG. 2) of the first embodiment of the present invention are coupled to separate outputs that are focused in an localized area of one or more of the symmetric non-zero diffraction orders of the FPR 14b to receive the wavelength channel light signals from separate ones of the lasers 12a, 12b, and 12c (as will be described in more detail hereinafter with reference to FIG. 2). Each optical power tap 16 detects the intensity of the received light signal and generates an output signal that is a measure of the power in the wavelength signal from the associated one of the plurality of lasers 12a, 12b, and 12c. The output signals from the optical power taps 16 can be transmitted to either the optional control device 18 for generating output control signals to each of the lasers 12a, 12b, and 12c when a power adjustment is required, or to another suitable termination (not shown) such as an automatic alarm or monitoring system that can be activated for subsequent manual intervention when required. Each power tap 16 typically includes an optical waveguide or a free space optical path and can direct the optical power to devices such as photodetectors and an optical spectrum analyzer.

Figure 2:
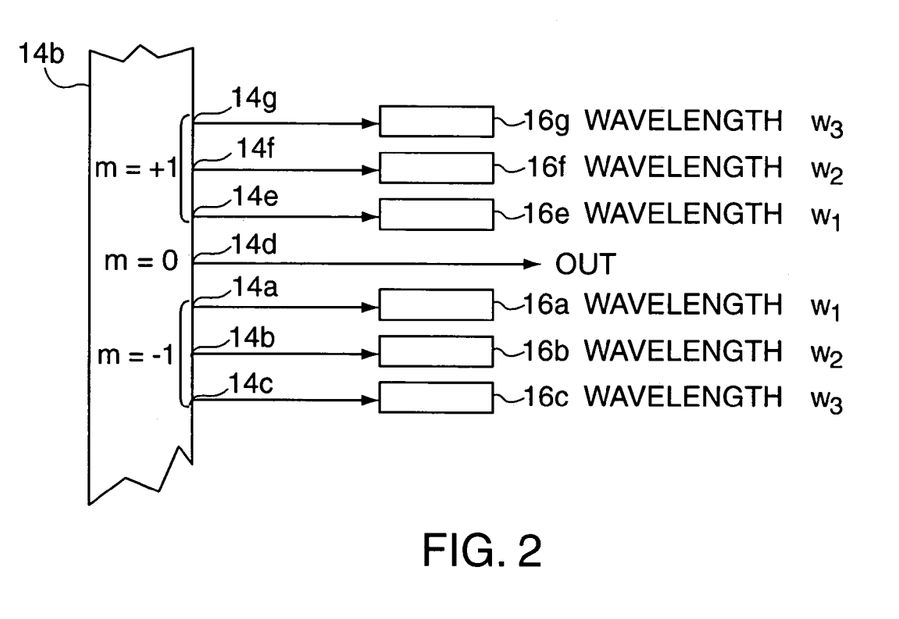
FIG. 2 is an exemplary enlarged portion of a free propagation region (FPR) and individual wavelength power taps obtained therefrom for the grating based device of FIG. 1.

Referring now to FIG. 2, there is shown an exemplary enlarged portion of the free propagation region (FPR) 14b of FIG. 1 and its outputs 14a–14g when lasers 12a, 12b, and 12c (shown in FIG. 1) generate widely spaced apart (sufficiently separated) wavelength channels in accordance with the first embodiment of the present invention. The location of output port 14d of the FPR 14b corresponds to the location of the focus point of the zeroth diffraction order (m=0) of the FPR 14b and provides the multiplexed output wavelength channels of the lasers 12a, 12b, and 12c as the output port 15 from the grating based device 10 of FIG. 1. The first FPR 14a, second FPR 14b, and the optical grating section 14c (shown in FIG. 1) are designed to resolve the wavelength signal output signal from lasers 12a, 12b, and 12c (shown in FIG. 1) at, for example, separate distinct locations within each of the m=−1 and the m=+1 diffraction order areas of the FPR 14b. Where the channels from the lasers 12a, 12b, and 12c cannot be resolved sufficiently in the m=−1 and/or m=+1 diffraction order areas, such signals may be resolved in a higher non-zero diffraction order as, for example, m=−2 and m=+2, m=−3 and m=+3, etc. When a higher diffraction order is used, less resolved power will be found in the signals from the lasers 12a, 12b, and 12c. It is assumed hereinafter that the wavelength channels from the lasers 12a, 12b, and 12c are separately adequately resolvable within both the m=+1 and m=−1 diffraction order areas of the FPR 14b.

As is seen in FIG. 2, first optical power taps 16a and 16e are coupled to output ports 14a and 14e, respectively, within the respective m=−1 and m=+1 diffraction order areas of the FPR 14b. The output ports 14a and 14e are positioned at the output side of the FPR 14b for receiving the resolved angular dispersion and diffracted wavelength (w1) signal from the first laser 12a. Second optical power taps 16b and 16f are coupled to output ports 14b and 14f, respectively, within the respective m=−1 and m=+1 diffraction order areas of the FPR 14b for receiving the resolved angular dispersion and diffracted wavelength signal (w2) from the second laser 12b. Third optical power tap 16c and 16g are coupled to output port 14c and 14g, respectively, within the respective m=−1 and m=+1 diffraction order areas of the FPR 14b for receiving the angular dispersion and diffracted wavelength signal (w3) from the third laser 12c. Because of symmetry, the power in each of the wavelength signals (w1, w2, and w3) from the lasers 12a, 12b, and 12c obtained at the output of the FPR 14b can be measured using just the power taps 16a, 16b, and 16c, respectively, at the m=−1 diffraction order. Similarly, the power in each of the wavelength signals (w1, w2, and w3) from the lasers 12a, 12b, and 12c obtained at the output of the FPR 14b can be measured using just the power taps 16e, 16f, and 16g, respectively, at the m=+1 diffraction order. Alternatively, the power in each of the wavelength signals (w1, w2, and w3) from the lasers 12a, 12b, and 12c obtained at the output of the FPR 14b can be measured using the power taps 16a and 16e, 16b and 16f, and 16c and 16g, respectively, at both the m=−1 and m=+1 diffraction orders. In either case, the measured power of the separate wavelength signals from the lasers 12a, 12b, and 12c can be used as needed. For example, the measured power can be either used directly (e.g., when obtained from one diffraction order m=−1 or m=+1), or further analyzed (e.g., when obtained from either one or both of the symmetric diffraction orders m=−1 and m=+1).

Figure 3:
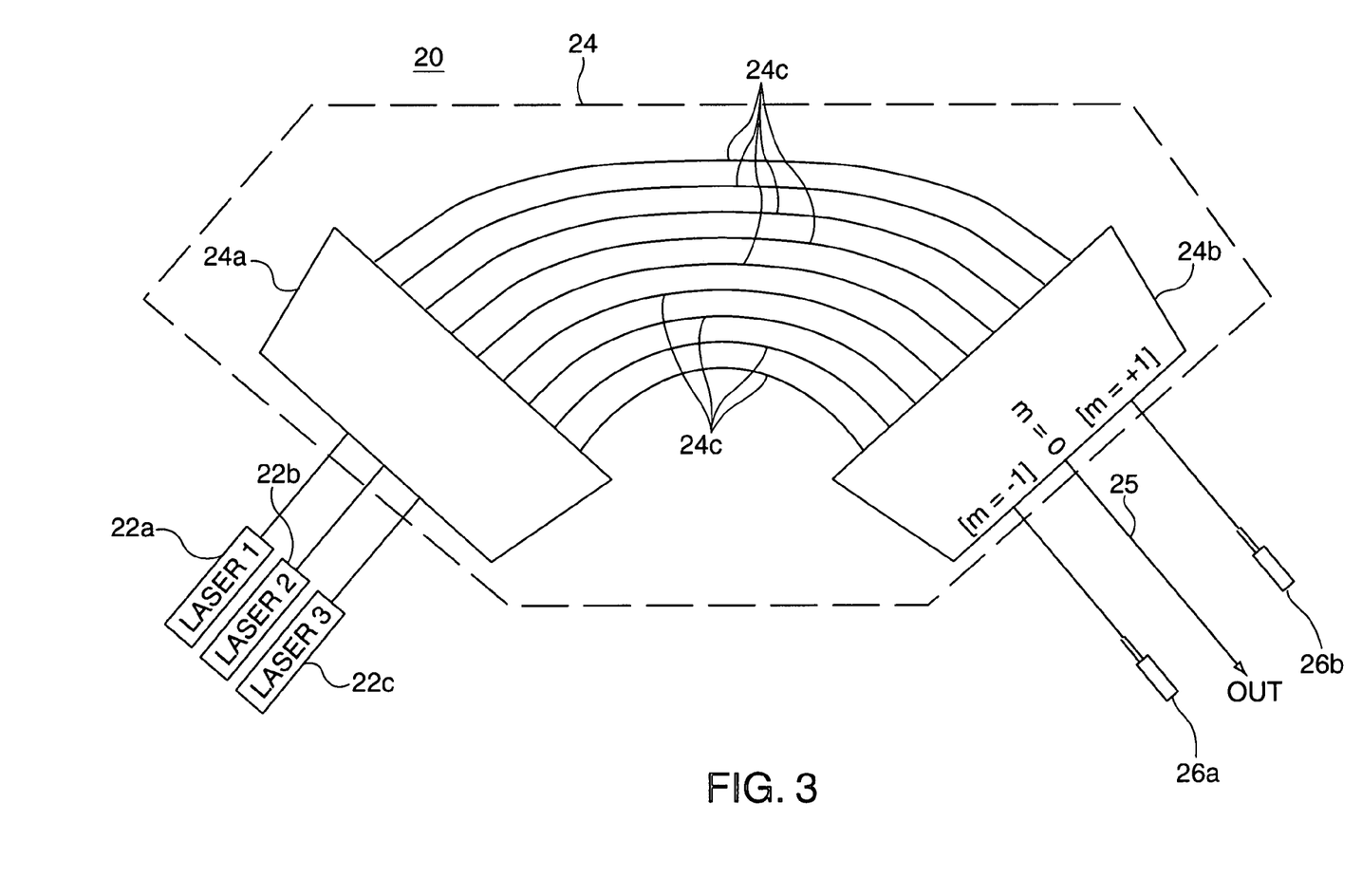
FIG. 3 is a schematic diagram of a grating based device including power taps in accordance with a second embodiment of the present invention.

Referring now to FIG. 3, there is shown a schematic diagram of a grating based device 20 including a plurality of radiation sources (shown as lasers 22a (LASER 1), 22b (LASER 2), and 22c (LASER 3)), an Arrayed Wavelength Grating (AWG) Multiplexer/Demultiplexer (MUX/DEMUX) 24 (shown within a dashed line area), and overall optical power taps 26a and 26b positioned in the m=−1 and m=+1 diffraction order areas, respectively, of the AWG MUX/DEMUX 24 in accordance with a second embodiment of the present invention. The AWG MUX/DEMUX 24 comprises a first Free Propagation Region (FPR) 24a, a second FPR 24b, and an optical grating section 24c formed from a plurality of predetermined different length waveguides. Each of the plurality of lasers 22a, 22b, and 22c is arranged to generate an output signal with a predetermined wavelength different from each of the other lasers where the wavelengths of the lasers 22a, 22b, and 22c are relatively densely spaced apart. The output signals from each of the lasers 22a, 22b, and 22c are coupled to separate appropriate inputs of the first FPR 24a.

The first and second FPRs 24a and 24b and optical grating section 24c of the Array Waveguide Grating (AWG) 24 utilize the principle of interference of phase shifted signals to multiplex or demultiplex optical signals as is well known in the art. In the case of the AWG multiplexer 24, multiple input signals from the lasers 22a, 22b, and 22c are individually positioned on the first waveguide slab of the first FPR 24a in such a way that after propagating through each of the first waveguide slab, the optical grating section 24c, and the second waveguide slab of the second FPR 24b, the location of the focus point of the zeroth diffraction order (m=0) of all input wavelength signals coincides with the location of the output waveguide 25. Most of the power of the multiplexed input signals from the lasers 22a, 22b, and 22c is found in the zeroth diffraction order (m=0), but some power of the multiplexed input signals resides in non-zero symmetric diffraction orders of m=−1 and m=+1, m=−2 and m=+2, etc, which power decreases as the diffraction order numbers increase. Because of the relative dense spacing of the wavelengths of the laser 22a, 22b, and 22c, the individual wavelengths from the lasers 22a, 22b, and 22c are not adequately resolved to separate locations in the non-zero symmetric diffraction orders of m=−1 and m=+1 in contrast to the case for the coarsely spaced wavelengths in the grating based device 10 of FIG. 1. Depending on the design of the AWG 24 and the wavelength range of the signals involved, the signals from the overall power taps 26a and 26b have to be further analyzed for reasons described hereinbelow in association with FIG. 4.

Figure 4:
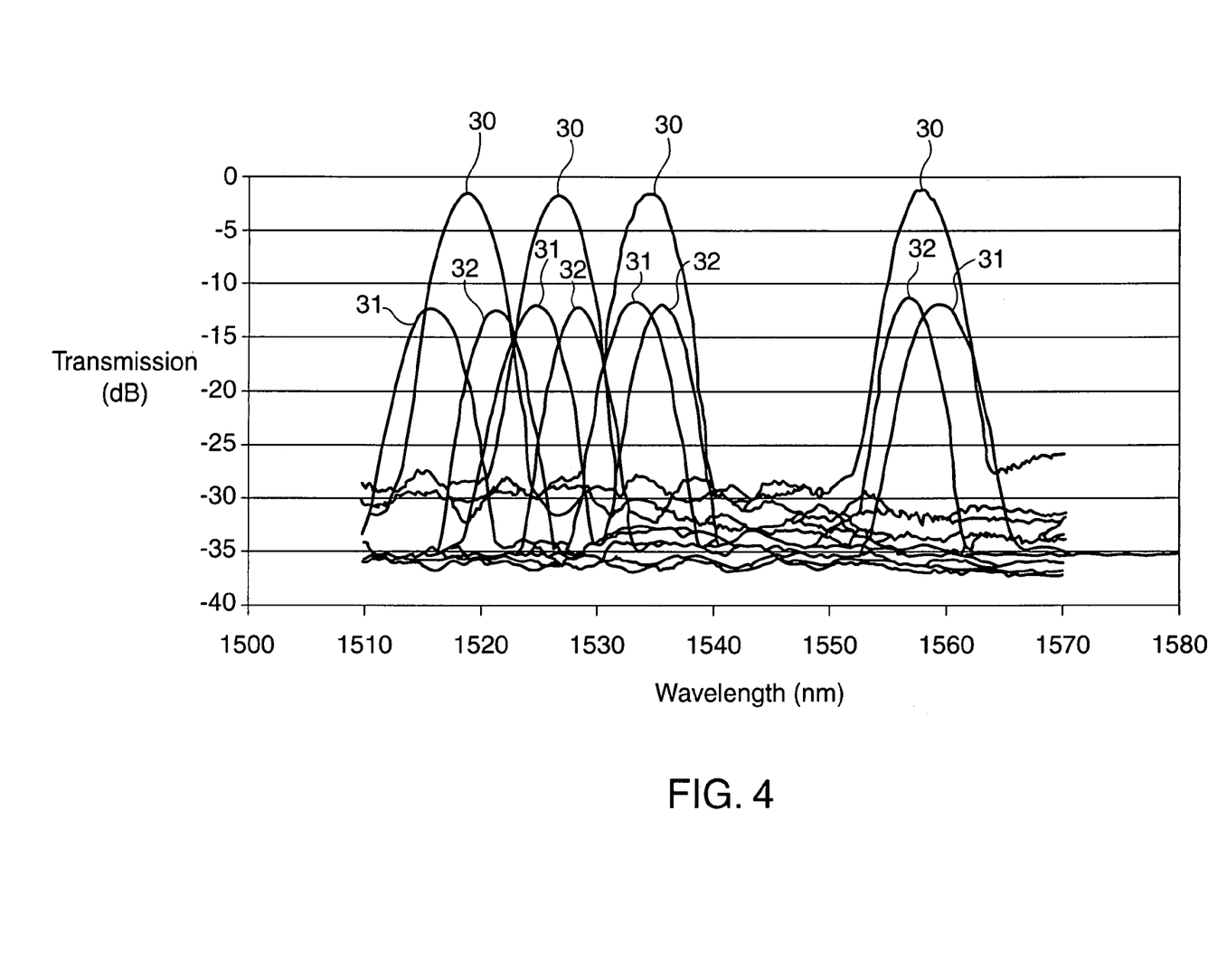
FIG. 4 is a graph of wavelength on the X-axis versus transmission (dB) on the Y-axis for exemplary multiplexed wavelength signal outputs that might be found at outputs of a predetermined design of the grating based device of FIG. 3.

Referring now to FIG. 4, there is shown a graph of wavelength (nm) on the X-axis versus transmission power (dB) on the Y-axis for multiplexed wavelength signal outputs depending on exemplary ranges of wavelength outputs of the lasers 22a, 22b, and 22c that might be found for a predetermined design of the grating based device 20 of FIG. 3. The graph of FIG. 4 illustrates the effect of angular dispersion and the need for analysis of the power data detected by the overall power taps 26a and 26b of the grating based device 20 of FIG. 3. Each curve 30 within a particular wavelength range (e.g., 1510–1525 nm, or 1520–1535 nm) represent the power in a multiplexed output signal from the lasers 22a, 22b, and 22c of FIG. 3 having a wavelength range that is centered at 1545 nm and obtained at the m=0 diffraction order location (at waveguide 25 of FIG. 3) for an exemplary designed AWG 24. Each of the curves 31 within a particular wavelength range (e.g., 1510–1525 nm, 1520–1535 nm, etc.) represents the power that would be obtained in the multiplexed signal at the m=+1 diffraction order location (at power tap 26b of FIG. 3) when the lasers 22a, 22b, and 22c of FIG. 3 generate their different wavelength output signals which are centered within the indicated range. Each of the curves 32 within a particular wavelength range (e.g., 1510–1525 nm, 1520–1535 nm, etc.) represent the power that would be obtained in the multiplexed signal at the m=−1 diffraction order location (at power tap 26a of FIG. 3) when the lasers 22a, 22b, and 22c of FIG. 3 generated their different wavelength output signals within the indicated range.

The exemplary data shown in the graph are for the grating based device 20 having an exemplary design to cover predetermined input wavelengths between 1510 nm and 1570 nm. In this design, the center wavelength of 1540 nm within the 1510–1570 nm design range is where the curves 30, 31, and 32 will be found to be centered on each other. When the center wavelength of a range of wavelengths of the lasers 22a, 22b, and 22c deviates from the center wavelength 1540 nm, angular dispersion causes the associated curves 31 and 32 are no longer centered on each other, and they become separated by increasing distances as the center wavelength of each wavelength range increases in separation from the 1540 nm wavelength. For example, the curves 31 and 32 within the wavelength range of 1510–1525 nm have their peaks separated by a greater distance that the curves 31 and 32 within the wavelength range of 1520–1535 nm. The occurrence of increasing separations of the curve 31 and 32 is mirrored on the opposite higher side of the center wavelength of 1540 nm as can be seen by the curves 31 and 32 within the wavelength range of 1550–1565 nm. Therefore, if only a single overall power tap (e.g., 26a or 26b) were positioned at either the m=−1 or the m=+1 location, as is generally found in the prior art, an accurate reading of the overall power would only be obtained only when the lasers 22a, 22b, and 22c generate a wavelength range that is centered at 1540 nm. The prior art does not consider the effect of angular dispersion when the input wavelength range (e.g., from any of lasers 22a, 22b, and 22c) deviates from a wavelength range centered at 1540 nm. By using two overall power taps 26a and 26b located at both the m=−1 and m=+1 diffraction order locations, respectively, and performing a data analysis utilizing both readings, a more accurate overall power reading is obtainable within the design range of the grating based device 20. The data analysis of concurrent readings from the overall power taps 26a and 26b can be performed by any suitable data processing method as, for example, averaging, weight averaging, etc. to obtain an overall power reading. The use of overall power taps 26a and 26b permits a grating based device to be used with any input wavelength range within the grating design, and obtain more accurate overall power readings than would be found by using only overall power tap.

Figure 5:
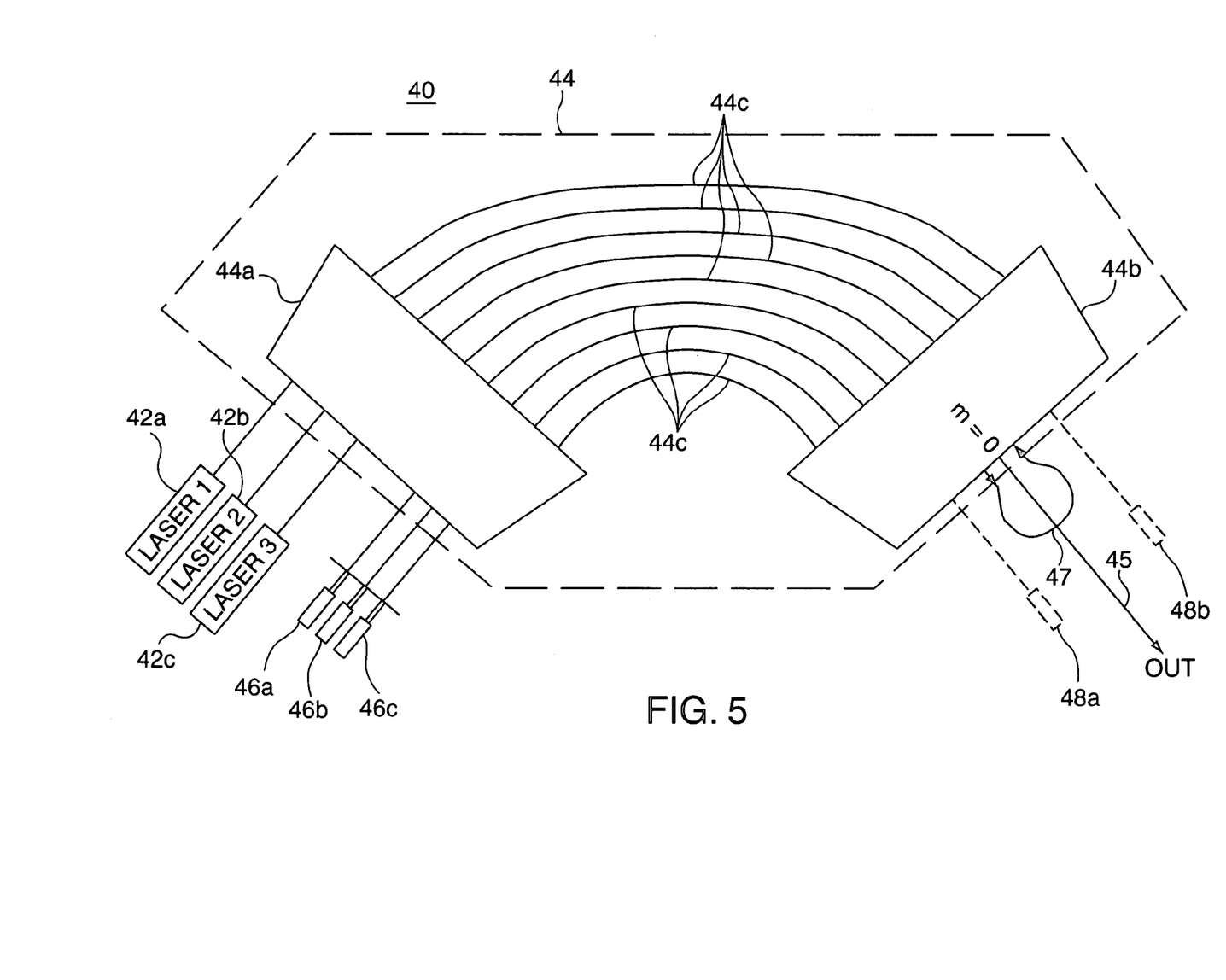
FIG. 5 is a general schematic diagram of a grating based device in accordance with a third embodiment of the present invention.

Referring now to FIG. 5, there is shown a general schematic diagram of a grating based device 40 including a plurality of radiation sources (shown as, and referred to hereinafter as, lasers 42a (LASER 1), 42b (LASER 2), and 42c (LASER 3)), an Arrayed Waveguide Grating (AWG) Multiplexer/Demultiplexer (MUX/DEMUX) 44 (shown within a dashed line area) including a feedback loop 47, and individual wavelength optical taps 46a, 46b, and 46c in accordance with a third embodiment of the present invention. The AWG MUX/DEMUX 44 comprises a first Free Propagation Region (FPR) 44a, a second FPR 44b, and an optical grating section 44c formed from a plurality of predetermined different length waveguides.

Each of the plurality of lasers 42a, 42b, and 42c are arranged to generate an output signal with a wavelength different from that of the other lasers. The output wavelength signals from the lasers 42a, 42b, and 42c are assumed to be relatively densely spaced apart, and are coupled to separate inputs of the first FPR 44a. The first and second FPRs 44a and 44b and the optical grating section 44c of the Array Waveguide Grating (AWG) 44 utilize the principle of interference of phase shifted signals to multiplex or demultiplex optical signals, as is well known in the art. In the typical case of an AWG multiplexer, multiple input signals from the lasers 42a, 42b, and 42c are individually positioned on a first waveguide slab forming the first FPR 44a in such a way that after propagating, in turn, through the first waveguide slab, the optical grating section 44c, and a second waveguide slab forming the second FPR 44b, the location of the focus point of the zeroth diffraction order (m=0) of all input wavelength signals coincides at the location of the output waveguide 45. Because of the dense spacing of the wavelengths from the lasers 42a, 42b, and 42c, the individual wavelengths from the lasers 42a, 42b, and 42c are not adequately resolved to separate locations in the non-zero symmetric diffraction orders of m=−1 and m=+1, m=−2 and m=+2, etc. as was in the case of the coarsely spaced wavelengths in the grating based device 10 of FIG. 1.

To better resolve the distinct wavelength signals from the lasers 42a, 42b, and 42c to individual wavelength power taps, a feedback loop 47 is provided that intercepts the power of the multiplexed wavelength signals at, for example, the m=−1 diffraction order area and returns the intercepted signal into the FPR 44b as close as possible to the m=0 diffraction order area of the FPR 44b. Redirecting the intercepted multiplexed wavelength signal back into the grating 44c spatially close to the center (m=0 diffraction order area) of the FPR 44b, it reduces grating and launch angle related losses. Still further, the return signal is spaced apart from the m=0 output position such that the individual power taps 46a, 46b, and 46c located at the input side of the FPR 44a do not overlap the input ports from the lasers 42a, 42b, and 42c. If overall power taps are also desired, first and second optional overall power taps 48a and 48b (shown in dashed lines) can be located to intercept the multiplexed wavelength signal at, for example, the m=−2 and m=+2 diffraction orders and process the obtained readings in a manner similar to that described earlier for the overall power taps 26a and 26b of FIG. 3.

Figure 6:
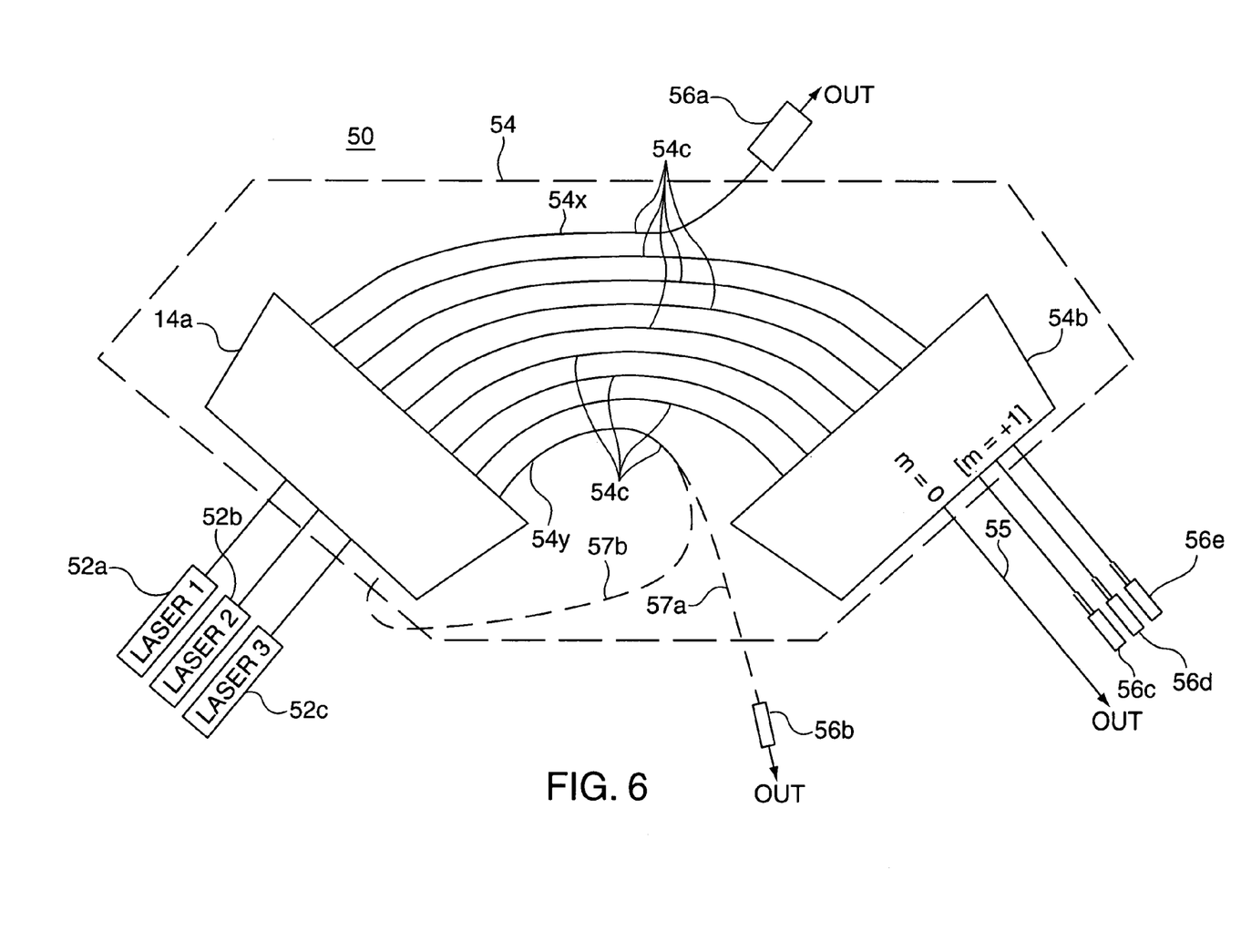
FIG. 6 is a general schematic diagram of a grating based device in accordance with a fourth embodiment of the present invention.

Referring now to FIG. 6, there is shown a general schematic diagram of a grating based device 50 including a plurality of radiation sources (shown as, and referred to hereinafter as, lasers 52a (LASER 1), 52b (LASER 2), and 52c (LASER 3)), and an Arrayed Waveguide Grating (AWG) Multiplexer/Demultiplexer (MUX/DEMUX) 54 (shown within a dashed line area) in accordance with a fourth embodiment of the present invention. The AWG MUX/DEMUX 54 comprises a first Free Propagation Region (FPR) 54a, a second FPR 54b, and an optical grating section 54c formed from a plurality of predetermined different length waveguides. Each of the plurality of lasers 52a, 52b, and 52c are arranged to generate an output signal with a predetermined wavelength different from that of the other lasers. The signals from the lasers 52a, 52b, and 52c are coupled to separate inputs of the first FPR 54a. The first and second FPRs 54a and 54b and the optical grating section 54c of the Arrayed Waveguide Grating (AWG) 54 utilize the principle of interference of phase shifted signals to multiplex or demultiplex optical signals as is well known in the art. In the typical case of an AWG multiplexer, multiple input signals from the lasers 52a, 52b, and 52c are individually positioned on a first waveguide slab forming the first FPR 54a in such a way that after propagating, in turn, through each of the first waveguide slab, the optical grating section 54c, and a second waveguide slab forming the second FPR 54b, the location of the focus point of the zeroth diffraction order (m=0) of all input wavelength signals coincides with the location of the output waveguide 55 for a multiplexed output signal from the device 50.

In the fourth embodiment, optical power is tapped after passing through only a portion (0.5, 1.5, etc.) of the AWG 54. In particular, some of the waveguides forming the optical grating section 54c at the output of the first FPR 54a can be used for power taps. In a first example of the fourth embodiment, outer waveguides 54x and 54y, which are first and last waveguides of the optical grating section 54c, are used to provide separate power taps 56a and 56b after the waveguide signals from the lasers 52a, 52b, and 52c have traveled only once through the first FPR 54a or the equivalent of approximately one-half (0.5) the distance through the AWG 54. The outer waveguides 54x and 54y of the optical grating section 54c are preferentially used because of ease of access thereto, and to avoid cross-talk when crossing over other waveguides of the optical grating section 54c.

Each of the waveguides 54x and 54y carries various proportions of the different wavelengths from the lasers 52a, 52b, and 52c, and as such, each of the power taps 56a and 56b would require some calibration based on the proportion of each wavelength power. The arrangement of tapping power after the wavelength power has only propagated through the first FPR 54a allows for lower loss since the power does not have to travel through the second FPR 54b. By not having to travel through the second FPR 54b, the power tapped directly after the first FPR 54a by power taps 56a and 56b is broadband and gives a better indication of the total power launched by the lasers 52a, 52b, and 52c into the first FPR 54a as compared to a total power that could be measured after being emitted from the second FPR 54b.

Where the wavelengths from the lasers 52a, 52b, and 52c are widely spaced apart (sufficiently separated), the AWG 54 can be designed not only to obtain the overall power at power taps 56a and/or 56b, but also to focus each of the wavelengths at separate adjacent positions within, for example, the m=−1 (not shown) and/or m=+1 diffraction orders at FPR 54b in the manner described hereinbefore for the grating based device 10 of FIG. 1. Each of the resolved wavelengths from the lasers 52*a*, 52*b*, and 52*c* can then be captured at individual power taps 56*c*, 56*d*, and 56*e*, respectively.

Where the wavelengths from the lasers 52*a*, 52*b*, and 52*c* are densely spaced apart so that the individual wavelengths cannot normally be resolved in a non-zero diffraction order of the second FPR 54*b*, one of the outer waveguides 54*x* and 54*y* of the optical grating section 54*c* can be looped back to an input of the first FPR 54*a*. As is shown in FIG. 6, the outer waveguide 54*y* is looped back via a dashed path 57*b* to an input of the first FPR 54*a* that is spaced apart from the inputs used for lasers 52*a*, 52*b*, and 52*c*, instead of going to overall power tap 56*b* via dashed path 57*a*. In essence, the multiplexed wavelength signal propagating in waveguide 54*y* is fed back to an input of the first FPR 54*a* and is demultiplexed in propagating through the first FPR 54*a*, the optical grating section 54*c*, and the second FPR 54*b*. Since the multiplexed signal from waveguide 54*y* was launched at a different input location from that of the lasers 52*a*, 52*b*, and 52*c*, the individual wavelength signals of the multiplexed signal will be demultiplexed and will appear at a non-zero diffraction order area (e.g., m=+1) of the second FPR 54*b*. These demultiplexed individual wavelength signals can then be captured by the individual power taps 56*c*, 56*d*, and 56*e*.

It is to be appreciated and understood that the specific embodiments of the present invention that have been described are merely illustrative of the general principles of the present invention. Various modifications may be made by those skilled in the art that are consistent with the principles of the invention set forth. For example, various types of grating can be used as for example, an Arrayed Waveguide Grating (AWG), a Bulk grating, an Echelle grating, etc.

What is claimed is:

1. An optical grating device comprising:
    a grating arrangement for receiving a different wavelength signal from each of a plurality of radiation sources at separate input ports thereof, and for generating therefrom an output signal of multiplexed wavelengths at a zero diffraction order output port of the grating arrangement, and at least one predetermined wavelength output signal at one of a group consisting of a separate predetermined location in an at least one of a symmetric non-zero diffraction order of the grating arrangement, within the grating arrangement itself, and a combination thereof; and
    at least one power tap, each power tap being coupled to the grating arrangement to detect the power of a separate one of the at least one predetermined wavelength output signal therefrom.

2. The optical grating device of claim 1 wherein:
    wavelengths of the wavelength signals received from the plurality of radiation sources are sufficiently separated; and
    the at least one wavelength output signal from the grating arrangement comprises separate ones of each of the sufficiently separated wavelength output signals received from the plurality of radiation sources that are focused at separate locations within both of a predetermined symmetric non-zero diffraction order of the grating arrangement.

3. The optical grating device of claim 1 wherein:
    wavelengths of the wavelength signals received from the plurality of radiation sources are densely spaced; and
    the at least one wavelength output signal from the grating arrangement comprises a first and second multiplexed wavelength output signal of the densely spaced apart wavelength signals from the plurality of radiation sources that are focused at separate predetermined locations with first and second ones of a predetermined symmetric non-zero diffraction order, respectively, of the grating arrangement.

4. The optical grating device of claim 3 wherein:
    the at least one power tap comprises a first and a second power tap to receive the first and second multiplexed wavelength output signals, respectively, that are focused in the respective first and second ones of a predetermined symmetric non-zero diffraction order of the grating arrangement where the power obtained by each power tap is dependent on angular dispersion and a wavelength range generated by the plurality of radiation sources.

5. The optical grating device of claim 1 wherein the grating arrangement is an Arrayed Waveguide Grating (AWG) comprising:
    a first Free Propagating Region (FPR) for receiving the different wavelength signals from the plurality of radiation sources at separate input ports at an input side thereof;
    a second FPR comprising an input and an output side thereof; and
    a grating array formed from a plurality of different length optical waveguides that couple an output side of the first FPR to the input side of the second FPR for causing the second FPR to generate both of the multiplexed wavelength output signal from the plurality of radiation sources at the zero diffraction order and said focused at least one predetermined wavelength output signal.

6. The optical grating device of claim 5 wherein the at least one predetermined wavelength output signal comprises first and second multiplexed wavelength output signals from the plurality of radiation sources that are obtained at a first and second waveguide, respectively, forming the plurality of different length optical waveguides of the grating array and coupled to respective first and second power taps.

7. The optical grating device of claim 6 wherein wavelengths of the different wavelength output signals from the plurality of radiation sources are sufficiently separated and each of said different wavelength output signals are focused at separate locations within an area of at least one of a set of predetermined symmetric non-zero diffraction orders at the second FPR and coupled to separate power taps.

8. The optical grating device of claim 6 wherein one of the first and second multiplexed wavelength output signals from the first and second optical waveguides of the grating array is fed back to an input port of the first FPR which is separated from the input ports of the plurality of radiation sources for causing each of the different wavelength output signals from the plurality of radiation sources to be demultiplexed and focused at separate locations within an area of one of a set of predetermined symmetric non-zero diffraction orders at the second FPR and coupled to separate power taps.

9. The optical grating device of claim 1 wherein:
    wavelengths of the wavelength signals received from the plurality of radiation sources are densely spaced apart;
    the at least one wavelength output signal from the grating arrangement comprises a multiplexed wavelength output signal of the densely spaced apart wavelength signals from the plurality of radiation sources that is focused at a separate predetermined location within a first one of a first set of predetermined symmetric non-zero diffraction orders of the grating arrangement: and the optical grating device further comprises:

a feedback loop for receiving the multiplexed wavelength output signal focused at the separate predetermined location within the first one of the first set of predetermined symmetric non-zero diffraction orders and feeding it back into the grating arrangement at a location adjacent the zero diffraction order output port for demultiplexing the multiplexed wavelength output signal and resolving each wavelength of the multiplexed signal to a separate input port of the grating arrangement that is not coincident with the input ports receiving the wavelength signals from the plurality of radiation sources and coupled to separate power taps.

10. The optical grating device of claim 9 wherein the at least one wavelength output signal from the grating arrangement comprises said multiplexed wavelength output signal focused within the first one of the first set of predetermined symmetric non-zero diffraction orders, and first and second multiplexed wavelength output signals from the plurality of radiation sources that are focused within each of a second set of predetermined symmetric non-zero diffraction orders and coupled to separate power taps.

11. An optical grating device comprising:

a grating arrangement for receiving widely spaced apart wavelength signals from a plurality of radiation sources at separate input ports thereof, and for generating therefrom a multiplexed wavelength output signal at a zero diffraction order output port of the grating arrangement, and separate ones of each of the widely spaced different wavelength output signals from the plurality of radiation sources that are focused at separate predetermined spaced apart locations within both areas of a set of predetermined symmetric non-zero diffraction orders of the grating arrangement; and a plurality of power taps, each power tap being coupled to detect the power of a separate one of the widely spaced apart wavelength output signals from the plurality of radiation sources that are focused at the separate predetermined spaced apart locations within both of the predetermined symmetric non-zero diffraction orders.

12. The optical grating device of claim 11 wherein the grating arrangement is an Arrayed Waveguide Grating (AWG) comprising:

a first Free Propagating Region (FPR) for receiving the widely spaced apart wavelength output signals from the plurality of radiation sources at separate input ports at an input side thereof;

a second FPR comprising an input and an output side thereof; and a grating array formed from a plurality of different length optical waveguides that couple an output side of the first FPR to the input side of the second FPR for causing the second FPR to generate both the multiplexed wavelength output signal from the widely spaced apart signals at the zero diffraction order and the focused widely spaced different wavelength output signals.

13. An optical grating device comprising:

a grating arrangement for receiving each of densely spaced apart wavelength output signals from a plurality of radiation sources at separate input ports thereof, and for generating therefrom a multiplexed wavelength output signal at a zero diffraction order output port of the grating arrangement, and first and second multiplexed wavelength output signals of the densely spaced apart wavelength output signals that are focused at separate predetermined locations within first and second ones of a predetermined symmetric non-zero diffraction order, respectively, of the grating arrangement; and first and second power taps coupled to detect the power of the first and second multiplexed wavelength output signals focused within the first and second ones of the predetermined symmetric non-zero diffraction order, respectively, of the grating arrangement.

14. The optical grating device of claim 13 wherein the grating arrangement is an Arrayed Waveguide Grating (AWG) comprising:

a first Free Propagating Region (FPR) for receiving the wavelength output signals from the plurality of radiation sources at separate input ports at an input side thereof;

a second FPR comprising an input and an output side thereof; and a grating array formed from a plurality of different length optical waveguides that couple an output side of the first FPR to the input side of the second FPR for causing the second FPR to generate both the multiplexed wavelength output signal from the plurality of radiation sources at the zero diffraction order and the focused first and second multiplexed wavelength output signals.

15. An optical grating device comprising:

a grating arrangement for receiving a different wavelength output signal from each of a plurality of radiation sources at separate input ports thereof, and for generating therefrom a first multiplexed wavelength output signal at a zero diffraction order output port of the grating arrangement, the grating arrangement comprising a feedback loop for coupling a second multiplexed wavelength output signal appearing at a non-zero diffraction order output port of the grating arrangement back into the grating arrangement adjacent the zero diffraction order output port so that each of the different wavelength output signals in the second multiplexed output signal are demultiplexed and focused to separate input ports of the grating arrangement that are not coincident with the input ports receiving the wavelength signals from the plurality of radiation sources; and a plurality of power taps, each power tap being coupled to the grating arrangement to detect the power of a separate one of the different wavelength output signals focused at said separate input ports thereof.

16. An optical grating device comprising:

a grating arrangement that is an Arrayed Waveguide Grating (AWG) comprising:

a first Free Propagating Region (FPR) for receiving a different wavelength output signal from each of a plurality of radiation sources at separate input ports at an input side thereof;

a second FPR comprising an input and an output side thereof; and a grating array formed from a plurality of different length optical waveguides that couple an output side of the first FPR to the input side of the second FPR for generating both a first multiplexed wavelength output signal from the different wavelength output signals received from the plurality of radiation sources at a zero diffraction order of the second FPR, and a second multiplexed wavelength output signal at a first predetermined waveguide forming the plurality of different length optical waveguides of the grating array; and a first power tap coupled to receive the multiplexed wavelength output signal from said predetermined waveguide forming the plurality of different length optical waveguides of the grating array.

17. The optical grating device of claim 16 wherein:

the grating array further generates a third multiplexed wavelength output signal at a second predetermined waveguide forming the plurality of different length optical waveguides of the grating array; and a second power tap coupled to the second predetermined waveguide forming the plurality of different length optical waveguides of the grating array.

18. The optical grating device of claim 16 wherein:

the grating array further generates a third multiplexed wavelength output signal at a second predetermined waveguide forming the plurality of different length optical waveguides of the grating array which is looped back into an input port of the first FPR that is not coincident with any of the input ports used to receive the different wavelength output signals from the plurality of radiation sources for causing each of the different wavelength output signals in the third multiplexed wavelength output signal to be demultiplexed and focused at separate locations within an area of one of a set of predetermined symmetric non-zero diffraction orders at the second FPR; and the grating device further comprises a plurality of second power taps, each second power tap coupled to receive a separate one of the focused different wavelength output signals in the third multiplexed wavelength output signal at the separate locations within said area of the one of the set of predetermined symmetric non-zero diffraction orders.

19. In combination:

optical grating means including input means for receiving signal power of different optical wavelengths from each of a plurality of radiation sources and output means for providing one of a group consisting of multiplexed power and individual power of the different optical wavelengths, the output means including a zero-order diffraction area and at least one non-zero order diffraction area;

main output means coupled to said zero-order diffraction area for abstracting said multiplexed power in an output signal of the optical grating means; and auxiliary output means coupled to the at least one of non-zero diffraction area for abstracting power of one of the group consisting of the multiplexed power and individual powers of the different optical wavelengths.

20. The combination of claim 19 wherein:

wavelengths of the different wavelength signals received from the plurality of radiation sources are widely spaced apart; and the auxiliary output means are coupled to both of a predetermined symmetric non-zero diffraction order area for abstracting power of the individual different optical wavelengths at separate locations within each of the predetermined symmetric non-zero diffraction order areas.

21. The combination of claim 19 wherein:

wavelengths of the different wavelength signals received from the plurality of radiation sources are densely spaced apart; and the auxiliary output means are coupled to both of a predetermined symmetric non-zero diffraction order area for abstracting power of the multiplexed power at a location within each of the predetermined symmetric non-zero diffraction order areas where the power obtained by each auxiliary means is dependent on angular dispersion and a wavelength range generated by the plurality of radiation sources.

* * * * *